Nov. 17, 1942.　　W. C. LAUGHLIN　　2,302,449
FILTER APPARATUS
Filed March 21, 1940　　6 Sheets-Sheet 1

INVENTOR.
WILLIAM C. LAUGHLIN
BY C. P. Goepel.
ATTORNEY

Nov. 17, 1942.    W. C. LAUGHLIN    2,302,449
FILTER APPARATUS
Filed March 21, 1940    6 Sheets-Sheet 2

INVENTOR.
WILLIAM C. LAUGHLIN
BY C. P. Goepel.
ATTORNEY

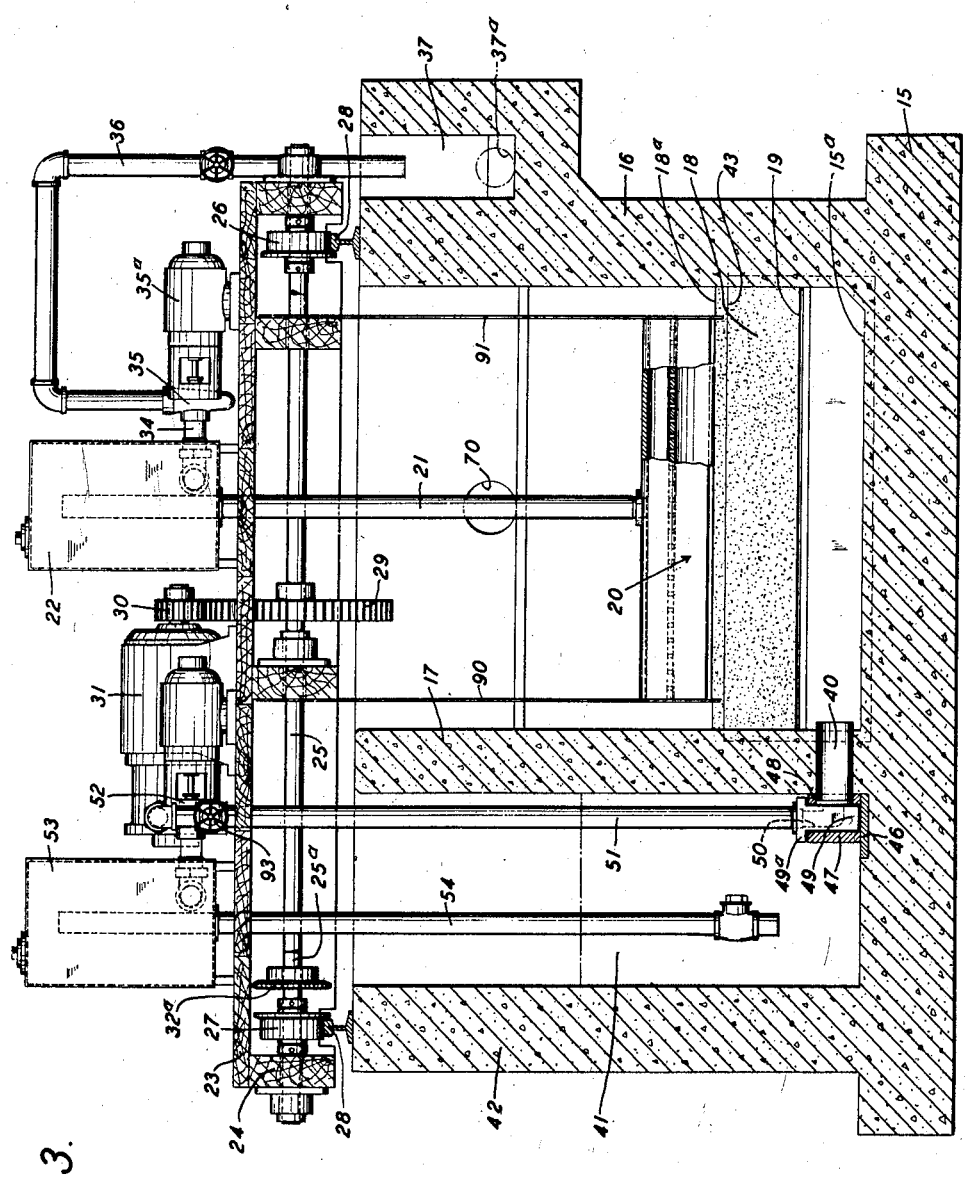

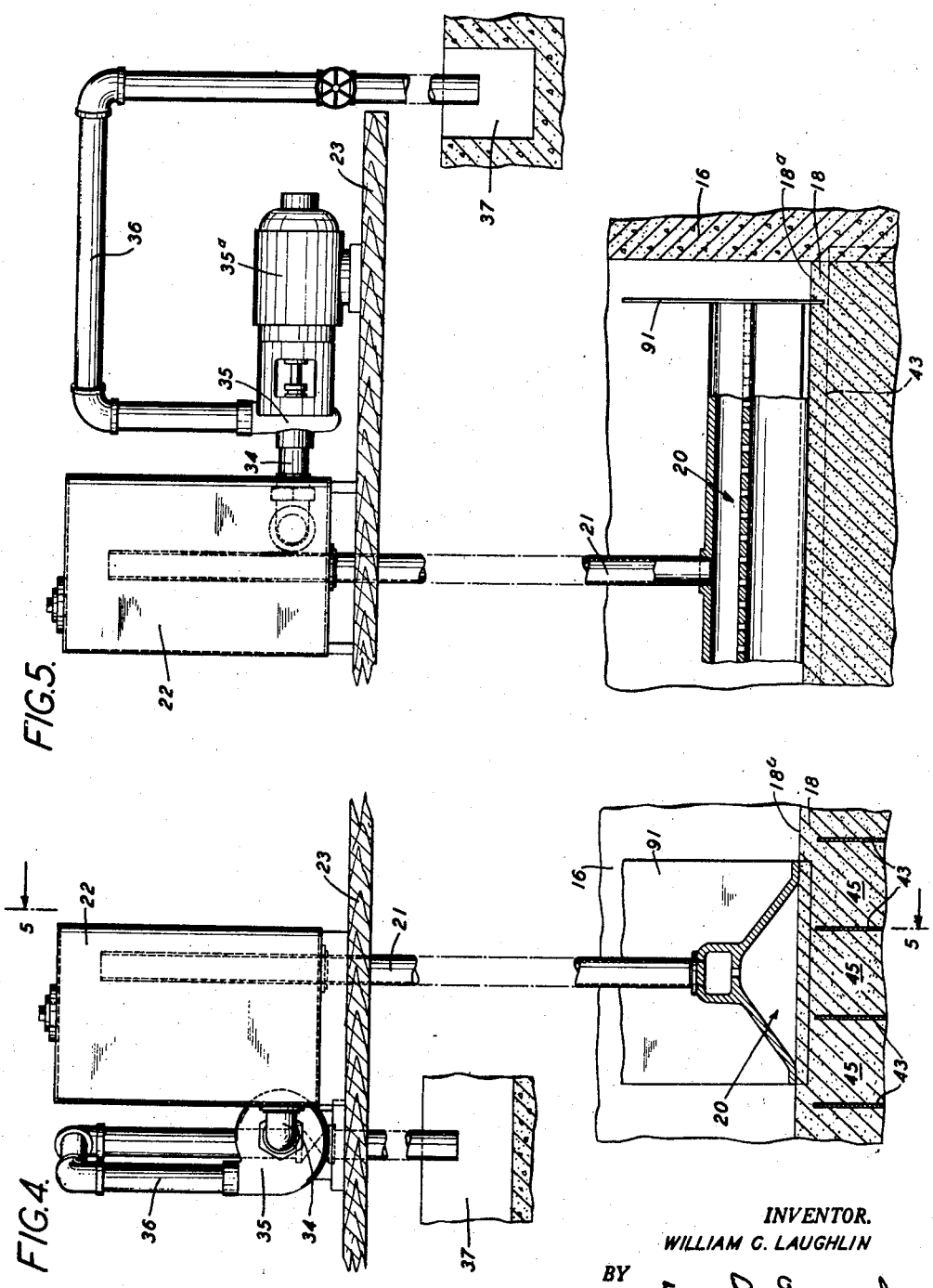

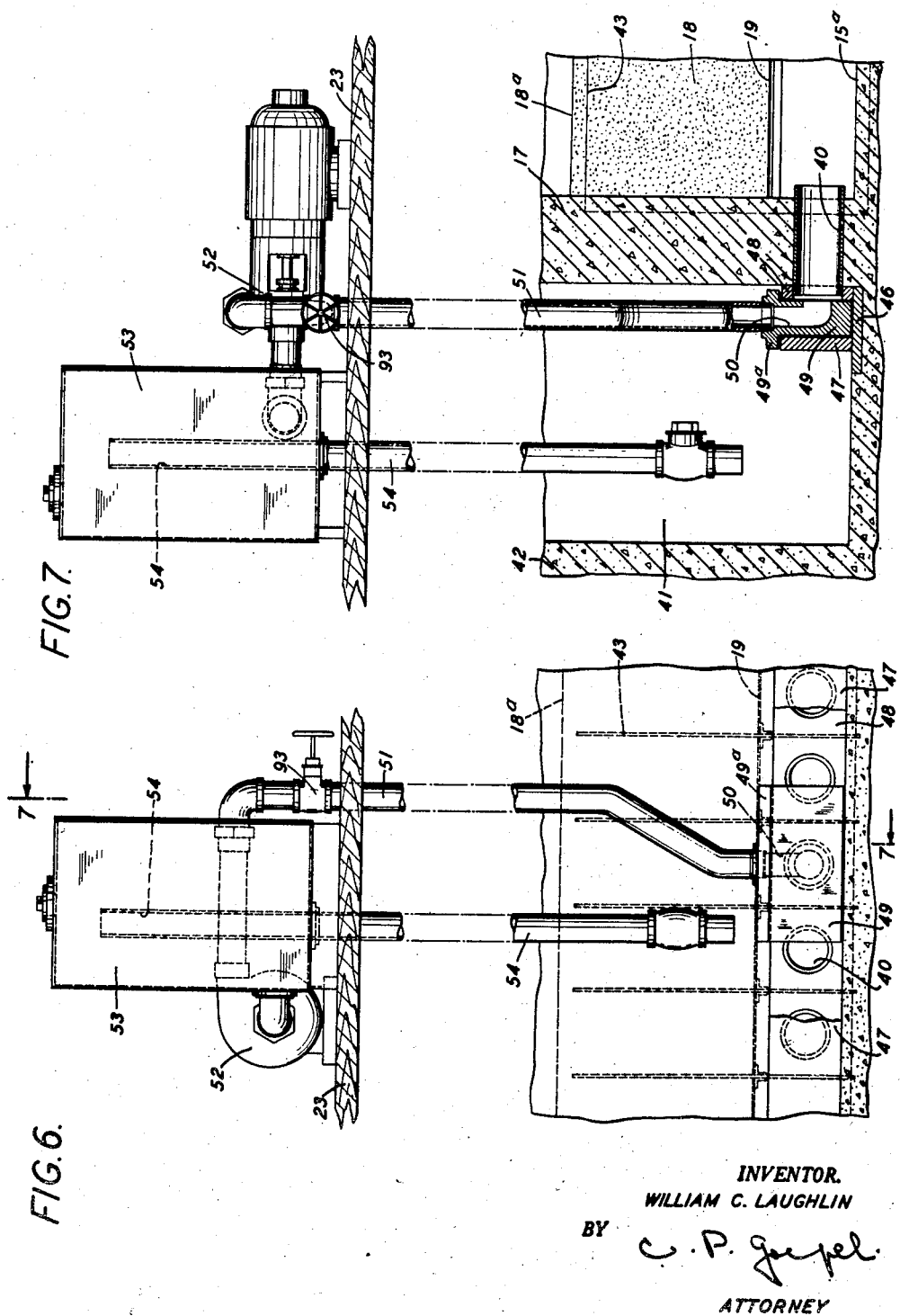

Nov. 17, 1942.   W. C. LAUGHLIN   2,302,449
FILTER APPARATUS
Filed March 21, 1940   6 Sheets-Sheet 6
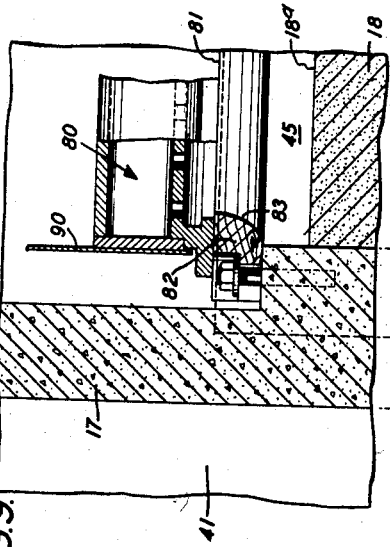
FIG.9
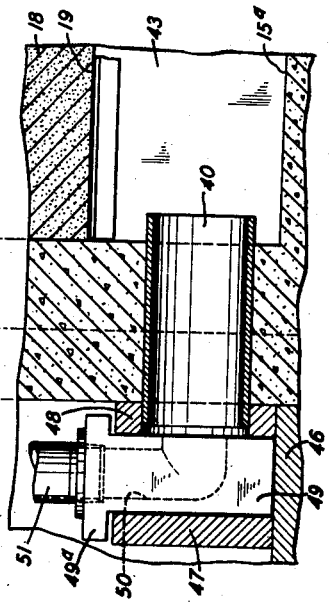
FIG.10
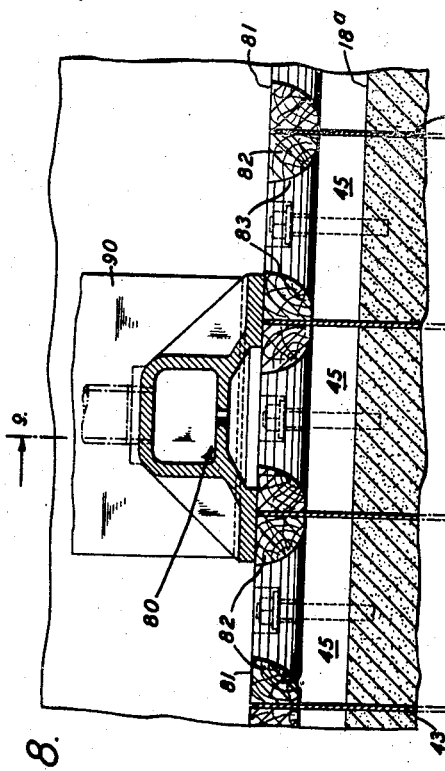
FIG.8
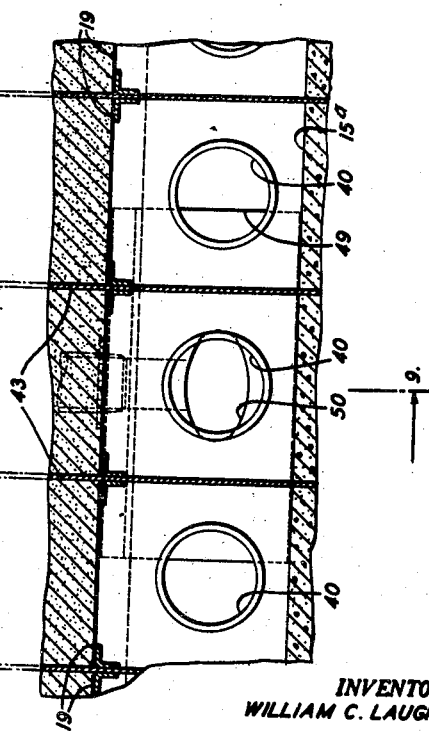
INVENTOR.
WILLIAM C. LAUGHLIN
BY C. P. Goepel.
ATTORNEY.

Patented Nov. 17, 1942

2,302,449

UNITED STATES PATENT OFFICE 2,302,449

FILTER APPARATUS

William C. Laughlin, New York, N. Y.

Application March 21, 1940, Serial No. 325,100

8 Claims. (Cl. 210—130)

This invention relates to filtering apparatus for sewage, water and waste products and the like.

The particular object of this invention is to provide a filter apparatus which may be readily cleaned during the operation of the apparatus without the necessity of interrupting the operation thereof.

Top surface and deep cleaners moving periodically over the top of the filter bed and through the filter bed have recently been proposed by me and have given satisfactory service. Such deep cleaning was essentially longitudinally of the filter bed, but in a transversely vertical direction from the lower part of the filter bed to the upper surface thereof. Such top and deep cleaning is carried out without stopping the operation of the filter apparatus.

The present invention provides for top surface cleaning, and combines this top surface cleaning with a deep cleaning by co-relating the top surface cleaner with vertically disposed cells extending transversely across the filter and from the bottom of the filter to the top thereof. Such independent cells extend the length of the filter apparatus, and when desired, any one of these cells may be subjected to the cleaning action of the effluent entering from below the sieve supporting the filter bed, through the filter bed upwardly therethrough to the top surface thereof, where ebullient or otherwise acting impurities may be removed by a top surface cleaner or other means. By actuating for cleansing purposes, one individual cell, by a back wash water, it is clear that the filter operation of the apparatus may be maintained and carried out while the apparatus is in general still in operation, only one such cell being out of filtering operation during its cleansing operation. The invention is not confined to one cell, two or three cells being co-jointly operable for such cleansing.

The invention will be more fully described hereinafter, it will be shown in the embodiments hereinafter described, and it will be finally pointed out in the claims.

In the accompanying drawings:

Figure 3 is a vertical transverse section taken on line 3—3 of Figure 1;

Figure 4 is a side view of the top surface cleaner shown in Figure 3;

Figure 5 is a vertical transverse section taken on line 5—5 of Figure 4;

Figure 6 is a side view of the cell cleaner;

Figure 7 is a vertical transverse section taken on line 7—7 of Figure 6;

Figure 8 is a modified form of top surface cleaner, the embodiment in Figure 8 showing a fixed and definite movement of the top surface cleaner over a partition wall;

Figure 9 is a vertical transverse section taken on line 9—9 of Figure 8; and

Figure 10 is a prospective view partly broken away of a frame forming the top partition.

Similar characters of reference indicate corresponding parts throughout the various views.

Figure 1:
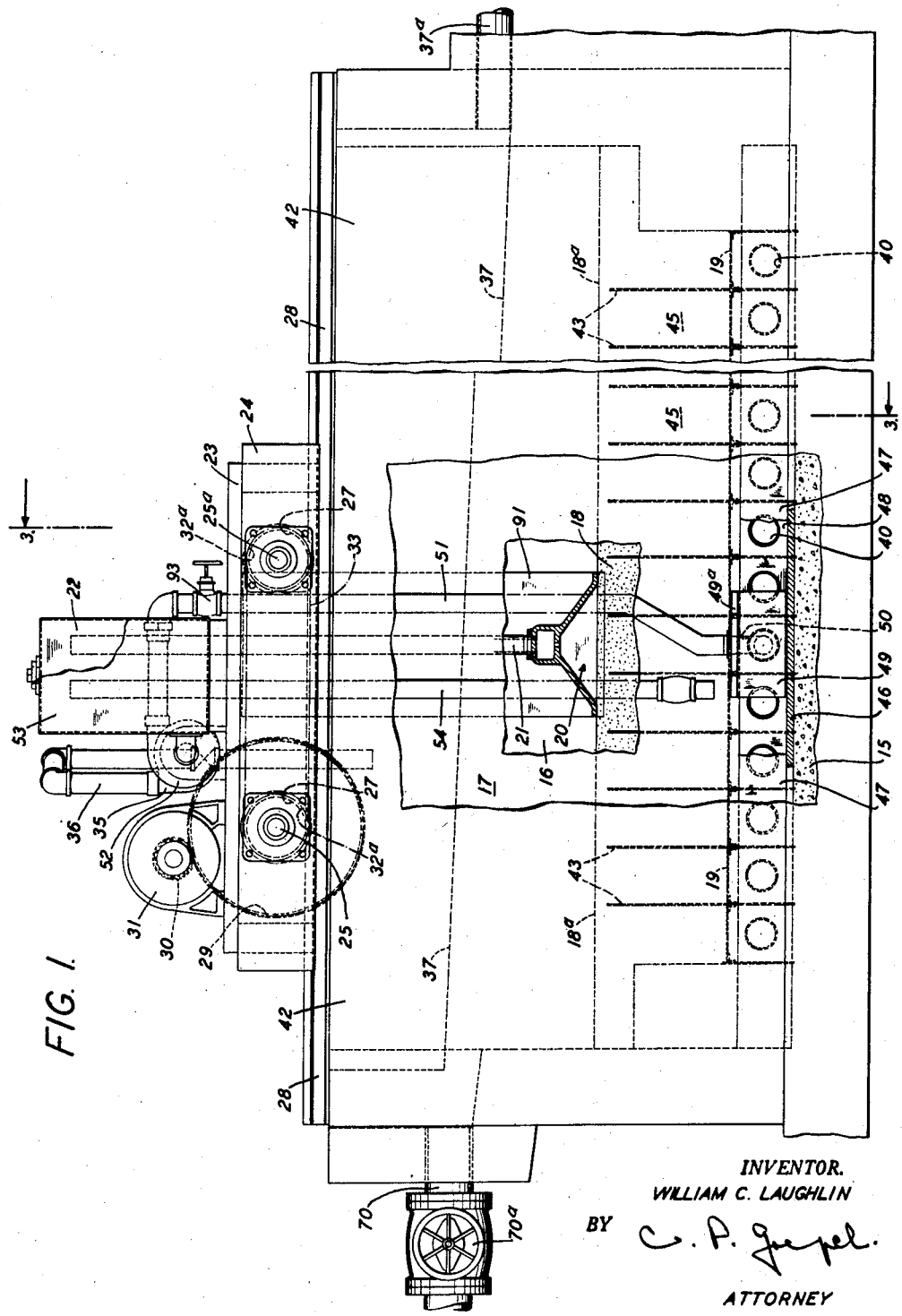
Figure 1 is a side elevation of my improved filtering apparatus.

Referring to the drawings, and more particularly to Figure 3, the filtering apparatus there shown in vertical transverse section consists of a tank portion 15 with two upright walls 16 and 17 between which walls 16 and 17 the filtering operation takes place therein. Between these walls 16 and 17 a bed of filtering material indicated by 18 is shown which is supported by a screen 19. The filtering bed 18 extends the length of the filter, which is up to 12' wide and of any length. Above the filtering bed, and upon its upper surface, is the top surface cleaner 20 having a vertical pipe 21 which extends into a priming box 22 which is supported on a horizontal platform 23 of the carriage 24. This carriage has a shaft 25 with wheels 26 and 27, which wheels are supported by rails 28 supported on the top of the filter apparatus. The shaft 25 has a gear wheel 29 which meshes with the pinion 30 rotated by a motor 31. The operation of this motor moves the carriage 24 to and fro along the top of the filter apparatus. Parallel with the shaft 25 is a shaft 25a which also has a wheel at each end thereof and which wheel rests upon the rails. This is shown better in Figure 2. The shaft 25 has a sprocket wheel 32, and the shaft 25a has a sprocket wheel 32a. Over the sprocket wheels 32 and 32a a sprocket chain 33 is provided, so that when the shaft 25 is operated by the motor 31, the shaft 25a is also moved by the sprocket chain 33. By the operation of the motor and these shafts, the carriage may be moved to and fro along the length of the filter apparatus, and by so moving the carriage to and fro, a vertical pipe 21 with the cleaner 20 is moved along the top surface of the filter bed 18. The top filter 20 is shown in the form of a hood-shaped device with openings, and is shown as an example, without any desire to be specifically limited thereto, as changes may be made therein as desired so as to have an efficient top surface cleaner.

Reference may be made hereto to my pending application Serial No. 285,078 filed July 18, 1939, and also my allowed application Serial No. 285,077 filed July 18, 1939.

Connected with the priming box 22, as more particularly shown in Figures 4 and 5, is a connection 34 to a centrifugal pump 35, and this pump is driven by a motor 35a. As the centrifugal pump is driven, it sucks from the priming box 22 the filter liquid and discharges it through the pipe 36 into the wash water launder 37 shown in Figures 5 and 3. This launder 37 serves to discharge its contents as a waste, as seen in Figure 1, by the pipe 37a.

Figure 2:
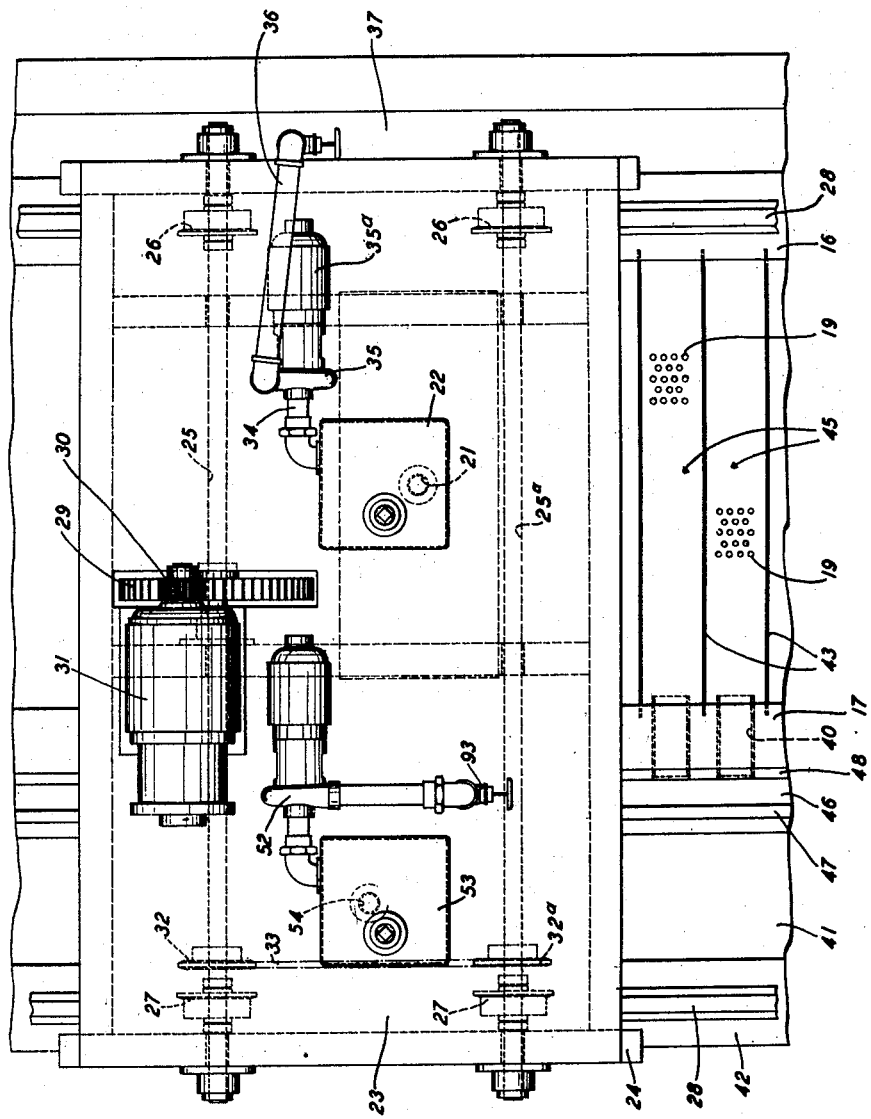
Figure 2 is a top view of the carriage.

Referring again to Figure 3, it will be noted that the filter bed material 18 is supported by the screen 19, as before described. The filter apparatus is provided with a plurality of longitudinally arranged adjacent cells, each extending below and above the sieve 19. Each of these cells has a pipe 40 which extends through the apparatus wall 17, and the pipes 40 bring about a communication between the downwardly flowing liquid below the sieve 19 and the liquid in the launder 41 formed with the wall 17 by the outer wall 42. As is seen in Figure 1, there are a plurality of upright partitions 43, which partitions 43 are unperforated, and these partitions extend from a distance somewhat below or above the top level 18a of the filter bed 18 and downwardly to the bottom 15a of the filter apparatus. In the embodiment shown in Figure 1, about twelve of these vertical partitions are shown, but more or less can be used, it being noted that in Figure 1 the drawing is broken in order to show continuity of the length of the filter apparatus. Thus, transverse cells are provided by means of these partitions 43 which divide the filter bed longitudinally into these transverse cells. In Figure 2 the reference numeral 45 shows these cells.

Referring now to Figures 3 and 7, at the lower part of the filter apparatus where the pipes 40 are arranged, a back-wash valve guide is provided which has a horizontal base plate 46 and a vertical plate 47 and a plate 48 which is connected with the pipe 40. Between the vertical plates 47 and 48 a valve member consisting of a block 49 having an interior channel 50 is arranged, this block being movable upon the base member 46 and between the vertical members 47 and 48. The block member 49 has a lateral extending shoulder portion 49a which shoulder portions rest upon the vertical members 47 and 48 and are guided thereby. Suitable rollers or antifriction devices may be interposed between this surface and this shoulder 49a and the vertical members 47 and 48. To the members 49a is secured a vertical pipe 51 which extends upwardly and communicates with the discharge and of a centrifugal pump 52 which pump communicates with the priming member 53 and the contents of which is in communication with the upright pipe 54 which descends into the launder 41. The operation, however, is that the pipe 54 receives its filter water or cleaning water from the launder 41 and delivers it to the priming member 53, which in turn has its contents sucked out by the centrifugal pump 52 and delivered into the valve member 49. As the valve member 49 covers, longitudinally considered, not quite two cells, the water thus passing through the valve 49 enters one of the pipes 40, at least and partially one or the other adjacent pipes 40, but registration takes place with only one. These sections or cells extend from bottom of tank. The top of one section or cell is not even with top of sand, the sand will be either about one inch above the side wall of the cell or two inches or more below the side wall of the cell, depending on whether paddle cleaner is used or just a box-pump take off of impurities.

The operation of my improved filter apparatus is as follows:

The medium to be cleaned enters the top of the apparatus by means of the inlet 70 which can be suitably controlled by any suitable device like a gate valve 70a of Figure 1, and passes through the filter bed 18 below in the respective cells described and then through the pipes 40 into the launder 41 from which it is conducted to any suitable place where a use or disposal is desired to be made thereof. As this filtering operation takes place, the top surface filter 20 is moved longitudinally along the top of the filter bed in order to keep the surface clean, if it be desired to constantly move it to and fro. It is not necessary to keep this going constantly, because, in view of the new cell formation of this filter apparatus, it is possible to clean these separate cells separately from each other during the course of the filtering operation, and the soiled parts of the filter can be taken away by the top surface cleaner and removed from the filter apparatus.

It will be seen, therefore, that a top surface cleaner is combined with a deep cleaner, the deep cleaner, however, depending for its operation upon the subdivision of the filter apparatus into a plurality of cells which are cleaned from their lowermost surface upwardly during the operation of the filter apparatus without discontinuing the operation of the same, except as to cell being upwardly washed.

Referring to Figures 8 and 9, there are certain cases wherein it is preferable to have the top surface cleaner indicated by 80 in Figure 8 move upon a fixed horizontal surface, and for this purpose a fixed horizontal surface 81 is provided which consists of a plurality of rectangularly shaped members 82 having a centrally elongated or oval opening 83 therein passing through these members 82. It will be noted in Figure 8 that the partitions which extend upwardly from the bottom of the filter apparatus and have between them parts or sections of the screen 19, have their uppermost ends connected with these members 82. The filter bed 18 has its top surface 18a arranged a slight distance below these members 82 which form the horizontal partition 81. The distance is, however, relatively small. It will be noted that the vertical partitions 43 form a portion of the upper part of the cell 45, and in fact the members 82, due to the smaller opening 83, bring about a constriction of the uppermost part of the cell 45, and when the top surface cleaner 80 straddles symmetrically the upper part of the cell 45, the suction in the top surface cleaner 80 then sucks up the medium with the impurities which are immediately above the filter bed 18. If, however, certain of the impurities should descend and enter into the filter bed and it be then desired to remove them, then the backwash action will take place, namely, by bringing the clean water through the pipes 40 and upwardly through the filter bed, in respect to the cell to be cleaned. The filter bed could be higher than the partitions 81, and in this case a top cleaner could be used which operates upon the surface of the filter bed as shown in the former alternative of Figure 4.

Referring again to Figure 3, it will be noted that there are suspended from the carriage 24 downwardly descending plates 90 and 91, and to the lowermost of these plates the top surface cleaner 20 is secured at each end thereof. In other words, the top surface cleaner 20 is supported by these plates 90 and 91, the pipe 21 not supporting the cleaner 20 but acting merely as a means of taking off the water. Of course, the pipe could be made strong enough to do this supporting without the plates 90 and 91.

It will therefore be seen that the filter apparatus has been divided into a large number of subdivisions or cells longitudinal of the apparatus, each cell extending transversely thereof. The top surface cleaner in one case acts independently of these cells, and in the other case it acts in cooperation with the cells. Similarly, a backwash valve operates as it travels so as to close the communication between the cells and the fresh water launder, and it forces clean water through the pipe shut off from the launder into the cells at the lower end thereof or upwardly through the cell, or against the filtering flow. Only one cell is operated upon by the upward flow cleansing operation at a time in the embodiment.

If required, the valve 93 may be used as a choke to control the amount of fluid passing downwardly through the pipe 51 and other suitable means, electrical or otherwise, can be provided to determine whether the fresh water is to be passed through the valve 49 and into any one of the pipes 40, and in consequence any one of the cells. This operation of the upward cleaning is arbitrary, depending upon the wishes and requirements of the operation of the filtering apparatus.

The top cleaner is run on a time cycle as desired and required, governed by the quantity of solids to be removed from the surface to maintain filler rates.

The bottom cleaner is also on a time cycle and may operate at all times with the top cleaner, or it may operate only on one trip while top cleaner operates on ten or more. They are operated by timing electric system. If bottom cleaner is to operate, it starts with top cleaner and must run at least to end of tank.

From the foregoing it has been seen that the length of the filter apparatus has been divided into longitudinally adjacent cells, each adjacent to the other, each of which has filter material therein, and each of which is for a down play filtering action, the filtrate passing out of one side of the cell into an adjacent channel communicating with an adjacent launder. In this channel into which each cell empties when filtering, there is a movable valve member. When this valve member comes opposite to any discharge opening of any cell, it closes the opening against further discharge, and clear effluent or other clean cleaning fluid is forced through the opening and up through the cell (in a direction in reverse to the filtering movement), and by this upward movement the impurities in the filter material are removed therefrom, that is, the filter material is cleaned, and these impurities with the entrained or entraining cleaning water are then removed from the filter apparatus. The surface or top cleaner can be used to remove such impurities in which case the top cleaner is placed over the cell being cleaned.

By the simple construction described and shown, expensive large numbers of valves are saved.

The top cleaner for sewage purposes can be moved over the top surface every half hour and the deep cleaner can be put into operation every three hours.

I have described several embodiments of my invention, but it will be clear that changes may be made within the principle of the invention described, without departing from the scope of the subjoined claims.

What is claimed is:

1. In an open top, low pressure filtering apparatus having a horizontal screen extending substantially the length and breadth of the apparatus for supporting filter bed material, a plurality of vertical transverse partitions dividing said filter bed into a plurality of cells, said partitions extending above said screen to form said cells with the filter bed between the impervious vertical partitions and with the latter extending below the horizontal screen to form the lower part of the cells free from filter bed material, means supplying an influent above the filter bed of the cells, a filtrate launder in communication with the lower part of the cells free from filter bed material, means for removing the filtrate from the launder, means movable along the launder for supplying one of said cells at its part below the horizontal screen with cleaning fluid to backwash each cell successively; whereby a filtering action takes place normally from top to bottom of each cell when said cell is open, and a cleaning action takes place from the bottom to the top of each cell when the cell is supplied with backwash water, and a catcher to receive the cleaning fluid after it leaves the filtered material for removing the cleaning fluid from the cell and from the filter.

2. In a filtering apparatus having a horizontal screen extending substantially the length and breadth of the apparatus for supporting filter bed material, a plurality of vertical partitions dividing said filter bed into a plurality of cells, said partitions extending above and below the screen, said partitions being impervious, means supplying the upper part of the filter bed with fluid water to be filtered; a launder at one side of the screen to receive the filtered effluent, means communicating between said launder and each cell to permit the passage of the filtered effluent from each cell to the launder, means movable along the length of the launder to close said communicating means for shutting off any cell to downward filtration, means supplying said cell with a cleaning fluid for upward movement of the same through the filter bed upwardly from the horizontal screen, and means at the upper part of the cell for discharging the cleaning fluid away from the cell and from the filtering apparatus.

3. In a filtering apparatus having a horizontal screen extending substantially the length and breadth of the apparatus for supporting filter bed material, a plurality of vertical partitions dividing said filter bed into a plurality of cells, said partitions extending above and below the screen, said partitions being impervious, means supplying fluid to be filtered above the filter bed of the cells; a launder at one side of the screen to receive the filtered effluent, means communicating between said launder and each cell to permit the passage of the filtered effluent from each cell to the launder, means movable along the length of the launder to close said communicating means for shutting off any cell, means forcing cleaning fluid into the shut-off cell and means discharging said cleaning fluid away from the upper part of the filtering apparatus.

4. In a filtering apparatus having a horizontal screen extending substantially the length and breadth of the apparatus for supporting filter bed material, a plurality of vertical partitions dividing said filter bed into a plurality of cells, each cell being normally open at the top and bottom, said partitions extending above and below the screen, said partitions being impervious, means supplying fluid to be filtered above the filter bed of the cells, a carriage movable over the filter bed longitudinally thereof, a cell shut-off valve supported thereby, a cleaner supported thereby, said cleaner acting above the filter bed, at the top of a cell, the shut-off valve being disposed at the lower end of the same cell, means for forcing into and through the shut-off valve at the lowermost part of the cell a cleaning fluid to the space below the screen and up through the same, and means connected with the cleaner above the filter bed for removing the cleaning fluid entering the cleaner from the top of the cell being cleaned and discharging said cleaning fluid away from said filtering apparatus.

5. In a filtering apparatus having a horizontal screen extending substantially the length and breadth of the apparatus for supporting filter bed material, a plurality of vertical partitions dividing said filter bed into a plurality of cells, each cell being normally open at the top and bottom, said partitions being impervious, means supplying fluid to be filtered above the filter bed of the cells, a carriage movable over the filter bed longitudinally thereof, a cell shut-off valve supported thereby, a cleaner supported thereby, said cleaner acting above the filter bed at the top of a cell, the shut-off valve being disposed at the lower end of the same cell, a horizontal partition having openings, one for each cell, said horizontal partition being above the filter bed material of each cell, said cleaner being slidably supported on the horizontal partition and shaped to straddle the vertical partitions of each cell and means connected with the cleaner for removing from the top of each cell the contents thereof with impurities and disposing of impurities outside of the filter apparatus.

6. In a filter apparatus, a cell composed of parallel impervious vertical walls, a horizontal pervious wall spaced from the ends of said vertical walls for supporting filter material thereon disposed between said vertical walls, impervious end walls for closing the ends of the vertical partitions to form separated closed cells open at the top and closed at the bottom, means to supply an influent above the open top, one of said end walls having an opening below the horizontal screen, for permitting the effluent at the bottom of the cell, to flow out of the cell, means adapted to be supplied to the opening of the bottom of the end wall to move an effluent in upward direction from the bottom to the top of the cell and means discharging said effluent from the top of the cell away from the filtering apparatus.

7. In a filter apparatus, a plurality of adjacent cells longitudinally disposed along the length of the apparatus, each cell having a screen disposed within the cell and spaced from the upper and lower ends of said cell for supporting filter bed material, each cell being normally open at the top and bottom, means supplying an influent to the upper ends of said cells, a carriage movable above the filter apparatus, a top cleaner supported by the carriage and movable along the top of the cells, a valve member supported by the carriage and movable along the lower end of each of said cells, means connecting said cleaner and valve member to act upon one cell at the same time, means removing filter effluent as it passes out of the cell when filtering the same and means for supplying influent as it enters the cell through the valve when cleaning the cell, and means for disposing of the waste fluid of the top cleaner away from the apparatus.

8. In a filtering apparatus having a plurality of adjacent cells with impervious walls separating the cells from each other, each cell having a filter bed pervious support for supporting the filter bed material, said support being spaced intermediate the ends of the cells, the cells having open tops and closed bottoms, each with a discharge opening for the filtrate passing from the top of the cell to the bottom of the cell by gravity action, means for supplying an influent to the top of the cells, a channel arranged alongside the plurality of cells communicating with each of the openings of each of the cells to normally receive the filtrate discharged from the cells, a movable valve member, closing the opening of any cell and when closing the same, preventing the flow of the filtrate to the channel, means forcing cleaning water through the valve member and into and through that cell from below the filter bed to above the same, and means removing the cleaning water from the upper part of the cell away from the filtering apparatus.

WILLIAM C. LAUGHLIN.